United States Patent
Holmqvist et al.

(10) Patent No.: US 8,662,012 B2
(45) Date of Patent: Mar. 4, 2014

(54) POSITIONING SYSTEM FOR AT LEAST ONE FLEXIBLE TUBULAR ELEMENT CONNECTED TO A CUP-SHAPED MEMBER

(75) Inventors: Jonas Holmqvist, Stockholm (SE); Kerstin Vollmer, Enkoping (SE)

(73) Assignee: DeLaval Holdings AB, Tumba (SE)

( * ) Notice: Subject to any disclaimer, the term of this patent is extended or adjusted under 35 U.S.C. 154(b) by 0 days.

(21) Appl. No.: 13/520,228

(22) PCT Filed: Jan. 5, 2011

(86) PCT No.: PCT/EP2011/050080
§ 371 (c)(1),
(2), (4) Date: Jul. 2, 2012

(87) PCT Pub. No.: WO2011/086015
PCT Pub. Date: Jul. 21, 2011

(65) Prior Publication Data
US 2013/0019807 A1    Jan. 24, 2013

Related U.S. Application Data

(60) Provisional application No. 61/299,488, filed on Jan. 29, 2010.

(30) Foreign Application Priority Data

Jan. 12, 2010    (SE) ........................... 1050016

(51) Int. Cl.
*A01J 5/017*    (2006.01)
(52) U.S. Cl.
USPC ..................... 119/14.13; 119/14.45

(58) Field of Classification Search
USPC ............ 119/14.13, 14.1, 14.08, 14.02, 14.01, 119/14.18, 14.45
See application file for complete search history.

(56) References Cited

U.S. PATENT DOCUMENTS 5,069,160 A * 12/1991 Street et al. ................. 119/14.08
6,244,215 B1 * 6/2001 Oosterling ................. 119/14.02
6,269,766 B1 * 8/2001 Birk ............................ 119/14.1

(Continued)

FOREIGN PATENT DOCUMENTS

DE    39 31 769 A1    10/2001
DE    10 2005 033 316 A1    1/2007

(Continued)

OTHER PUBLICATIONS

International-Type Search Report, dated Jun. 16, 2010, from corresponding PCT application.

(Continued)

*Primary Examiner* — T. Nguyen
(74) *Attorney, Agent, or Firm* — Young & Thompson

(57) ABSTRACT

A positioning system for at least one flexible tubular element (5, 6, 9) connected to a cup-shaped member (4, 8) includes a control unit (14) which is arranged to estimate an individually adapted release length of the tubular element (5, 6, 9) in response to information from a sensing unit (12, 13a, 13b) arranged to sense a parameter allowing estimation of the position of a teat of an animal. The control unit (14) is also arranged to control the positioning mechanism to adjust the release length of the tubular element (5, 6, 9) to the estimated individually adapted release length.

20 Claims, 3 Drawing Sheets

(56) References Cited

U.S. PATENT DOCUMENTS

| | | | |
|---|---|---|---|
| 6,948,449 B2 * | 9/2005 | Van der Lingen et al. | 119/14.13 |
| 2005/0072363 A1 * | 4/2005 | Van der Lingen et al. | 119/14.13 |
| 2007/0277737 A1 | 12/2007 | Maier et al. | |
| 2013/0180455 A1 * | 7/2013 | Holmertz et al. | 119/14.08 |

FOREIGN PATENT DOCUMENTS

| | | |
|---|---|---|
| EP | 0 332 235 A2 | 9/1989 |
| EP | 0 320 496 B2 | 12/1992 |
| EP | 0 647 391 A2 | 4/1995 |
| RU | 2053653 C1 | 2/1996 |
| SU | 1064923 A | 1/1984 |
| SU | 1604284 A1 | 11/1990 |
| WO | 99/07212 A1 | 2/1999 |
| WO | 01/67848 A1 | 9/2001 |
| WO | 02/15676 A1 | 2/2002 |

OTHER PUBLICATIONS

International Search Report, dated Jun. 30, 2011, from corresponding PCT application.
Supplementary International Search Report, dated Mar. 29, 2012, from corresponding PCT application.

* cited by examiner

POSITIONING SYSTEM FOR AT LEAST ONE FLEXIBLE TUBULAR ELEMENT CONNECTED TO A CUP-SHAPED MEMBER

BACKGROUND OF THE INVENTION AND PRIOR ART

The present invention relates to a positioning system for at least one tubular element connected to a cup-shaped member, wherein the positioning system comprises a positioning mechanism adapted to hold the cup-shaped member and the tubular element in a parking position in a magazine when the cup-shaped member is not used and to allow a pull out motion of the cup-shaped body and the tubular element from the parking position to an attaching position on a teat of an animal.

Teat cups are usually provided with a milk tube and a pulse tube. In automatic milking system, the teat cups are attached to the teats of a cow by means of a robot arm. The robot arm grips the teat cups in a teat cup magazine and moves them to a respective teat of the cow. During this motion, the milk tubes and the pulse tubes of the respective teat cups are pulled out from the teat cup magazine. It is important that the tubes are not pulled out to a too long length such that they come in contact with a floor surface on which the cow stands. In this case, there is a risk that the cow steps on the milk tube and the pulse tube and blocks the flow in the tubes. There is also a risk that the cow kicks on the milk tube and the pulse tube so that the teat cup becomes detached from the teat. In both cases, a teat of the cow will not be completely milked. It is also important that the milk tube and the pulse tube have a release length such that the teat cup will hang substantially vertically downwards from the teat when it is attached to a teat. If the tubes are pulled out to a too short length the tubes will exert a lateral force on the teat cup. In this case, the milking process may be disturbed and the teat cup risks being detached from the teat.

Different cows in a herd have the teats at different levels above the ground surface when they are in a standing position. When cows, having the teats at a low level above the ground surface are milked, there is an increased risk that the tubes of the teats cups will come in contact with the floor surface in the milking stall. Furthermore, the cows are usually able to stand in somewhat different positions in relation to the teat cup magazine during a milking process in a milking stall. Thereby, the distance between the teat cup magazine and the cow may vary even during milking processes of one and the same cow. In view of these facts, it is difficult to find a predetermined release length of the milk tube and the pulse tube which is suitable to use during all milking processes in a milking stall.

In an automatic milking system having a robot arm permanently arranged in a milking stall, the above mentioned problem has been solved in the following manner. When the robot arm fetches and attaches the teat cups to the teats of a cow in the milking stall, the milk tubes and the pulse tubes of the teat cups are pulled out such that they will have a relatively long length. Thereby, there is no risk that the tubes will be too short. During the following milking process of the cow, the robot arm holds the tubes of the teat cups in a lifted state such that the tubes do not risk coming in contact with the floor surface in the milking stall. However, this solution does not work in automatic milking system having a robot arm attaching teat cups to cows in a plurality of milking stalls on, for example, a rotary milking platform.

SUMMARY OF THE INVENTION

The object of the present invention is to provide a positioning system for a tubular element of a cup-shaped member which ensures that the tubular element will be pulled out to a suitable release length during substantially all occasions when the cup-shaped member is attached to a teat of the animal.

This object is obtained, according to the invention, by the feature that the positioning system comprises a control unit which is arranged to estimate an individually adapted release length of the tubular element in response to information from sensing means arranged to sense a parameter allowing estimation of the position of a teat of an animal, wherein said control unit is also arranged to control the positioning mechanism such that it adjusts the release length of the tubular element to the estimated individually adapted release length. By means of such an adjustment of the release length of the tubular element, it is possible to give the tubular element an individually adapted release length during substantially all occasions when the cup-shaped member is attached to a teat of the animal.

According to an embodiment of the invention, the positioning mechanism is adapted to control the pull out motion of the tubular element when the cup-shaped member is moved from the parking position to an attaching position on a teat such the tubular element will not be pulled out to a greater length than the estimated release length. When the cup-shaped member is gripped in the magazine and moved to the teat, the positioning mechanism prevents that the tubular element will be pulled to a greater length than the estimated release length. If the tubular element has been pulled out to the estimated release length, the positioning mechanism prevents a further pull out motion of the tubular element. Alternatively, the positioning mechanism is not adapted to control the pull out motion of the tubular element when the cup-shaped member is moved from the parking position to an attaching position on a teat, but instead the positioning mechanism is adapted to adjust the release length of the tubular element to the estimated release length when the cup-shaped member has been attached to the teat. In this case, the tubular element is pulled out to a suitable release length during the attaching process of the teat-shaped member. As soon as the teat-shaped member has been attached to the teat or after a short period of time, the position mechanism is activated in a manner such that it adjusts the actual release length of the tubular element to the estimated release length. In this case, it is possible to give the tubular element a longer release length during the attaching process than the estimated release length.

According to an embodiment of the invention, the control unit is arranged to estimate a suitable release length of the tubular element resulting in that a lowest part of the tubular element will be located at least at a level located at a minimum height above a floor surface on which the animal stands. Such a lowest acceptable level may for example be 10 centimeters above the floor surface. In this case, the control unit estimates a released length of the tubular element at which the lowest part of the tubular element will be located at this lowest acceptable level or at a higher level above the floor surface. Thereby, the risk that the animal steps on the tubular element or kicks on it such that the cup-shaped member becomes detached is substantially eliminated.

According to an embodiment of the invention, the control unit is arranged to estimate a suitable release length of the tubular element resulting in that a lowest part of the tubular element will be located at a level located at least at a minimum distance below the level of the cup-shaped member. Said minimum distance may, for example, be 10 centimeters. In this case, the control unit estimates a released length of the tubular element at which the lowest part of the tubular element will be located at this minimum distance or at a greater distance below the level of the cup shaped member. Thereby, the tubular element hangs downwardly from the cup-shaped member with an angle such that the tubular element does not exert a lateral force on the cup-shaped member.

According to an embodiment of the invention, the control unit is arranged to substantially continuously receive information from said sensing means about the position of said animal during the time the cup-shaped member is attached to the teat, to substantially continuously estimate a suitable release length of the tubular element and to control the positioning mechanism such that it adjusts the release length of the tubular element to the latest estimated release length. It is usually possible for an animal to perform at least small motions in a milking stall when the cup-shaped member is attached to the teat. In this case, the control unit is able to estimate a new suitable release length of the tubular element as soon as the animal has performed a motion in the milking stall. Thereafter, the positioning mechanism adjusts the length of the tubular element to this new value. In this case, the release length of the tubular element will be continuously adjusted to a suitable value during the whole time the cup-shaped member is attached to the teat.

According to an embodiment of the invention, said sensing means comprises an identification sensor adapted to sense the identity of the animal, and the control unit is arranged to estimate at least one coordinate of said teat by means of stored information about individual animals. Individual animal have the teats at different levels above the ground surface when they are in a standing position. By means of such stored information of individual animals, it possible to estimate at least the vertical coordinate of the teats of an identified animal in the milking stall. Said sensing means may comprise positioning means adapted to detect at least one of the coordinates of said teat. Such a positioning means may be a camera or a position sensor able to detect one or several coordinates of a teat. If, for example, the animal performs a motion, the positions of the teats are changed. By means of such positioning means, it is possible to detect actual coordinates of a teat during the whole time a cup-shaped member is attached to the teat. In the case that a robot arm is used to attach the cup-shaped member to a teat of an animal, it is also possible to use the coordinates of the robot arm to estimate the coordinates of the teat when the cup-shaped member is attached to the teat.

According to an embodiment of the invention, the positioning mechanism may comprise a stationarily arranged guiding element in the magazine and a movably arranged guiding element of the tubular element and a drive arrangement adapted to displace the movable guiding element to positions located at different distances from the stationary guiding element when the release length of the tubular element is to be varied. By means of such guiding elements it is very easy to adjust the release length of the tubular element. At least the movable guiding element may comprise a rolling member adapted to support an upper curved part of the tubular element. Thereby, it is possible to pull out the tubular element with a relatively small force.

According to an embodiment of the invention the positioning mechanism may be adapted to displace the movable guiding element to a number of predetermined fixed positions located at different distances from the stationary supporting element when the release length of the tubular element is to be varied. In this case, the release length of the tubular element may be varied in suitable steps. Alternatively, the positioning mechanism may be adapted to displace the movable guiding element, in a stepless manner, to positions located at different distances from the stationary guiding element when the release length of the tubular element is to be varied. In this case, the release length of the tubular element may be adjusted in a stepless manner.

According to an embodiment of the invention, the drive arrangement comprises a motor and a transmission adapted to displace the movable guiding element along a path in relation to the stationary guiding element. Preferably, the motor is an electric motor. An electric motor is easy to activate and to control. However, it is possible to use other kinds of motors. The transmission may comprise gear wheels adapted to displace the movable guiding element along a path formed by gear rods. By means of such a transmission it is possible to displace the movable guiding element to different positions in relation to the stationary guiding element quickly and with a very high precision.

According to an embodiment of the invention, the control unit is adapted receive information from a sensor when the cup-shaped member is to be removed from the teat and to activate the positioning mechanism such that it retracts the cup-shaped member from the attaching position on the teat to the parking position in the magazine. In this case, the positioning mechanism is also used to detach the cup-shaped member from the teat. Thus, a separate removing device, which usually comprises a vacuum cylinder, does not need to be used.

According to an embodiment of the invention, the cup-shaped member is a teat cup attached to a teat during a milking process. Tubular elements in the form of a milk tube and a pulse tube are connected to the teat cup. Alternatively, the cup-shaped member is a teat cleaning cup attached to the teat during a cleaning process of the teat. A cup is many times used for cleaning the teats before a milking process is started. The connected tubular element may here be adapted to supply a cleaning liquid to the teat and to discharge the cleaning liquid from the teat cleaning cup.

BRIEF DESCRIPTION OF THE DRAWINGS

In the following, a preferred embodiment of the invention is described by means of an example and with references to the attached drawings, in which.

BRIEF DESCRIPTION OF A PREFERRED EMBODIMENT OF THE INVENTION

Figure 1:
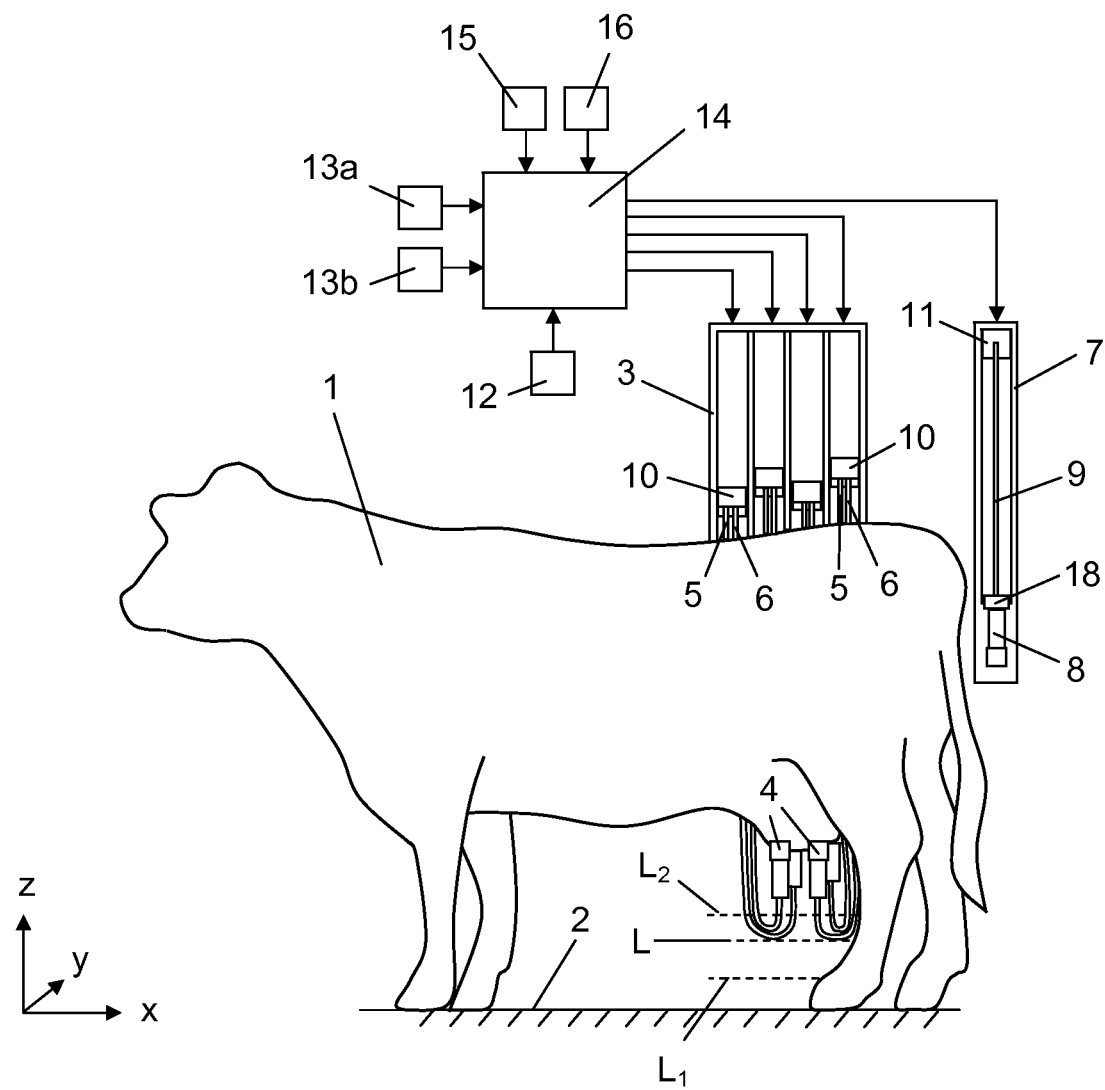
FIG. 1 shows a cow during a milking process and a positioning system according to the invention.

FIG. 1 shows a cow 1 standing on a floor surface 2 in a milking stall. The milking stall comprises a teat cup magazine 3 with four teat cups 4. Each teat cup 4 is connected to a milk tube 5 and a pulse tube 6. The milking stall also comprises a teat cleaning cup magazine 7 with a teat cleaning cup 8. The teat cleaning cup 8 is connected to a tubular element 9. Preferably, the teat cups 4 and the teat cleaning cup 8 are attached to the teats of the cow 1 by means of a not visible robot arm. Before a milking process is started in the milking stall, the teats of the cow 1 have to be cleaned. The robot arm fetches the teat cleaning cup 8 from a parking position in teat cleaning cup magazine 7 and moves it to the respective teats of the cow 1 in proper order. When the cleaning process of the teats is ready, the teat cleaning cup 8 is retracted to its parking position in the teat cleaning cup magazine 7 by means of a positioning mechanism. Thereafter, the robot arm fetches the teat cups 4 from their respective parking positions in the teat cup magazine 3 and attaches them to the teats of the cow 1. The milking process starts as soon as all teat cups 4 have been attached to the teats of the cow 1. When the milking process is finished, the teat cups 4 are individually retracted to the parking positions in the teat cup magazine 3 by means of a respective positioning mechanism.

Thus, the teat cup magazine 3 comprises a positioning mechanism for each teat cup 4. Each positioning mechanism comprises a movably arranged guiding element 10 adapted to guide an upper curved end position of the milk tube 5 and the pulse tube 6 in the magazine 3. The guiding element 10 is displaceable in a vertical direction in the teat cup magazine 3. The release length of the milk tube 5 and the pulse tube 6 is defined by the vertical position of the guiding element 10. The positioning mechanisms have a construction allowing a pull out motion of a teat cup 4 and the connected milk tube 5 and the pulse tube 6 from the parking position in the magazine 3 to an attaching position on a teat of the cow 1 by means of a robot arm.

The teat cleaning cup magazine 7 comprises a corresponding positioning mechanism for the teat cleaning cup 8. This positioning mechanism comprises a movably arranged guiding element 11 adapted to define an upper curved end position of the tubular element 9 in the magazine 7. The guiding element 11 is displaceable in a vertical direction in the teat cleaning cup magazine 7. A stationarily arranged guiding element 18 defines the parking position of the teat cleaning cup 8 in the magazine 7. FIG. 1 shows the teat cleaning cup 8 and the connected tubular element 9 in a parking position in the magazine 7. The release length of the tubular element 9 is defined by the vertical position of the guiding element 11.

It is important that the tubes 5, 6 are not pulled out to a too long length such that a part of the tubes 5, 6 will be lying on the floor surface in the milking stall when the teat cups 4 are attached to the teats of a cow 1. In this case, there is a risk that the cow 1 steps on the milk tube 5 or the pulse tube 6 and blocks the flow in this tube 5, 6 during the milking process. There is also a risk that the cow kicks on the tubes 5, 6 so that the teat cup 4 becomes detached from the teat. In both cases, a teat of the cow will not be completely milked. On the other hand, it is important that the milk tube 5 and the pulse tube 6 are not pulled out to a too short length. In this case, the milk tube 5 and the pulse tube 6 will exert a lateral force on the teat cup 4. The milking process of the teat may be disturbed and the teat cup 4 risks to become detached from the teat. Thus, it is important that the milk tube 5 and the pulse tube 6 are pulled out to a suitable release length when the teat cups 4 are attached to the teats of a cow 1.

The milking stall comprises a positioning system for controlling the release length of the tubes 5, 6 when the teat cups 4 are attached to the teats of a cow 1 in the milking stall. The positioning system comprises a control unit 14 which is arranged to estimate an individually adapted release length of the tubes 5, 6 in response to information from sensing means 12, 13a, 13b arranged to sense a parameter allowing estimation of the position of a teat of an animal 1. The control unit 14 is also arranged to control the positioning mechanism such that it adjusts the release length of the tubes 5, 6 to the estimated individually adapted release length.

In this case, the sensing means comprises an identifying sensor 12 adapted to identify the cow 1 to be milked in the milking stall. The sensing means comprises further a teat position sensor 13a adapted to detect the coordinates x, y, z of the teats of a cow 1 in the milking stall. The teat position sensor 13a may be a camera arranged on the robot arm attaching the teat cups to the teats. By means of such a teat position sensor, it is possible to detect all coordinates x, y, z of the teats of the cow 1 before and during the attachment of the teat cups to the teats of a cow 1. Furthermore, the sensing means comprises a cow position sensor 13b. The cow position sensor 13b may be a camera arranged in a position above the cow 1 in the milking stall. Such a cow position sensor 13b detects the position of a cow 1 in the milking stall and thus the coordinates x, y of the teats in a horizontal plane.

The identifying sensor 12 identifies the cow in the milking stall before a milking process is started. The control unit 14 receives information from the identifying sensor 12 about the identity of the cow 1. The control unit 14 has access to information stored in a database about the coordinates $x_0$, $y_0$, $z_0$ of the teats of individual cows 1 when they are in a specified position in the milking stall. The vertical coordinate z of the teats is constant but the horizontal coordinates x, y of the teats vary with the position of the cow in the milking stall. The cow position sensor 13b detects the position of the cow 1 in the milking stall. By means of said stored coordinates $x_0$, $y_0$, $z_0$ of the teats and the position of the cow 1 in the milking stall, it is possible for the control unit 14 to perform a estimation of the coordinates x, y, z of the teats in the milking stall. This estimation of the coordinates is rather rough.

The control unit 14 estimates a suitable release length of the respective tubes 5, 6 by means of said estimated coordinates x, y, z. The control unit 14 controls the robot arm such that it grips and moves a teat cup 4 to a predetermined position in relation to a teat of the cow 1 by means of said estimated coordinates x, y, z. When the teat cup 4 is in such a position, the control unit 14 receives a more exact information of the coordinates x, y, z of the teat from the camera 13a on the robot arm. By means of this information, the control unit 14 estimates an adjusted release length of the tubes 5, 6 connected to the teat cup 4. When the robot arm has attached all teat cups 4 to a respective teat of the cow 1, the milking process is started. During the whole milking process, the control unit 14 receives substantially continuously information from the cow position sensor 13b about the position of the cow 1 in the milking stall. When the cow 1 performs a movement in the milking stall, it is detected by the cow position sensor 13b. The control unit 14 receives information from the cow position sensor 13b about the new position of the cow 1 in the milking stall. The control unit 14 estimates new values of the release lengths of the tubes 5, 6 and controls the positioning mechanism such that it adjusts the release lengths of the tubes 5, 6 to the latest estimated release lengths.

According to an alternative embodiment, the identifying sensor 12 is excluded. In this case, the control unit 14 activates the robot arm such that it is moved to a position in the vicinity of the teats of the cow 1. The camera 13a on the robot arm detects the coordinates of the teats. At the same time, the cow position sensor 13b detects the position of the cow 1 in the milking stall. The control unit stores the information of the coordinates x, y, z of the teats when the cow 1 is in the detected position in the milking stall. The control unit estimates by means of the coordinates x, y, z of the teats suitable release lengths of the tubes 5, 6 and the robot arm attaches the teat cups 14 to the teats of the cow 1. The control unit 14 receives substantially continuously information from the cow position sensor 13b about the position of the cow 1 in the milking stall. As soon as the cow performs a movement in the milking stall, the control unit 14 estimates new values of the release lengths of the tubes 5, 6 and controls the positioning mechanism such that it adjusts the release lengths of the tubes 5, 6 to the latest estimated release lengths.

By knowledge of the coordinates x, y, z of the teats of the cow 1 and the coordinates of the parking positions of the teat cup 4 in the magazine 3, the end positions of the pulled out tubes 5, 6 are known when the teat cup 4 is attached to a teat of the cow 1. The flexible tubes 5, 6 extend along a downwardly curved path between said end positions when the teat cups have been attached to the teats. The position of the lowest part of the tubes 5, 6 is defined by the release length of the tubes 5, 6. At the estimated release length of the tubes 5, 6, the lowest part of the tubes 5, 6 is located at a lowest acceptable level $L_1$ or at a higher level above the floor surface 2 in the milking stall. The positioning mechanism is adapted to control the pull out motion of the tubes 5, 6 such that they will not be pulled out to a greater length than the estimated release length of the tubes 5, 6. The lowest acceptable level $L_1$ above the floor surface 2 is a value where the risk that the cow steps on or kicks on the tubes 5, 6 is substantially eliminated. The lowest acceptable level $L_1$ may, for example, be 10 cm above the floor surface 2. Furthermore, said estimated release length of the milk tube 5 and the pulse tube 6 has not to be too short when a teat cup 4 is attached to a teat. At the estimated release length of the tubes 5, 6, the lowest part of the tubes 5, 6 are located at least at a level $L_2$ located at a minimum distance below the teat cup 4 such that the tubes 5, 6 do not exert a lateral force on the teat cup 4 when it is attached to a teat. The level $L_2$ may, for example, be 10 cm below the teat cup 4.

Preferably, the control unit 14 is arranged to estimate a suitable release length of the tubes 5, 6 in which the lowest part of the tubes 5, 6 is positioned at a level L located at a distance above the level $L_1$ and at a distance below the level $L_2$. The estimated release length of the tubes 5, 6 may be of a value such that the lowest part of the tubes 5, 6 will be located at a level L substantially midway between the level $L_1$ and the level $L_2$. If a cow has very low hanging teats, the desired level $L_1$ may for this cow be at a higher level than the desired level $L_2$. In such a case, the positioning system finds an optimum level L that ensures that the tubes 5, 6 do not exert too much lateral force on the teat cup 4 while still ensuring that the risk that the cow steps or kicks on the tubes 5, 6 is reasonably low. The positioning system can achieve this by using a secondary set of levels for $L_1$ and $L_2$ if the primary set does not work.

The control unit 14 receives substantially continuously information from, for example, the cow position sensor 13b about the actual position of the cow 1 during the whole time as the teat cup 4 is attached to the teat. The control unit 14 determines substantially continuously an actual suitable value of the release length of the tubes 5, 6 such that the lowest part of the tubes 5, 6 will be located at a level L between the levels $L_1$ and $L_2$. In this case, the release length of the tubes 5, 6 is adjusted as soon as the cow 1 performs a movement in the milking stall during the milking process. The tubes 5, 6 of the four teat cups 4 may be individually adjusted such that the lowest part of all tubes 5, 6 will be located on substantially the same level L during the milking process.

During the attaching process of a teat cup to a teat, the positioning mechanism may be adapted to control the pull out motion of the milk tube 5 and the pulse tube 6 when the teat cup 4 is moved from the parking position to an attaching position on a teat such that the milk tube 5 and the pulse tube 6 will not be pulled out to a greater length than the estimated release length. In this case, if the milk tube 5 and the pulse tube 6 has been pulled out to the estimated release length before the teat cups is attached to the teat, the positioning mechanism is adapted to block a further pull out motion of the milk tube 5 and the pulse tube 6.

During an alternative attaching process of a teat cup to a teat, the positioning mechanism is not adapted to control the pull out motion of the milk tube 5 and the pulse tube 6 when the teat cup 4 is moved from the parking position to an attaching position on a teat, but instead the positioning mechanism is adapted to adjust the release length of the milk tube 5 and the pulse tube 6 to the estimated release length as soon as or a short period of time after the cup-shaped member has been attached to the teat. In this case, the position mechanism starts to adjust the release length of the milk tube 5 and the pulse tube 6 when the teat cup has been attached to the teat. In this case, it is possible to give the milk tube 5 and the pulse tube 6 a longer release length during the attaching process than the estimated release length.

A milk meter 15 measures the milk flow in each milk tube 5 of the teat cups 4 during the milking process. When the milk flow in a milk tube 5 drops below a predetermined value, the control unit 14 observes that the milking process is finished. The control unit 14 activates the positioning mechanism such that it displaces the corresponding guiding element 11 to an upper end position in the teat cup magazine 3. Thereby, the teat cup 4 will be removed from the attaching position on the teat and moved to the parking position in the magazine 3.

The positioning mechanism of the teat cleaning cup magazine 7 is adapted to control the release length of the tubular element 9 when the teat cleaning cup 8 cleans the teats of the cow 1 in a corresponding manner as the positioning mechanisms in the teat cup magazine 3. Thereby, the lowest located part of the tubular element 9 will be located at a corresponding level L above the floor surface 2 during the cleaning process of the teats as the tubes 5, 6 during the milking process. In this case, the control unit 14 receives information from a sensor 16 informing then the cleaning processes of the teats have been finished. The sensor 16 may receive information from the robot arm when all teats of the cow 1 have been cleaned. When all teats have been cleaned, the control unit 14 activates the positioning mechanism such that it moves the teat cleaning cup 8 to the parking position in the magazine 7.

Figure 2:
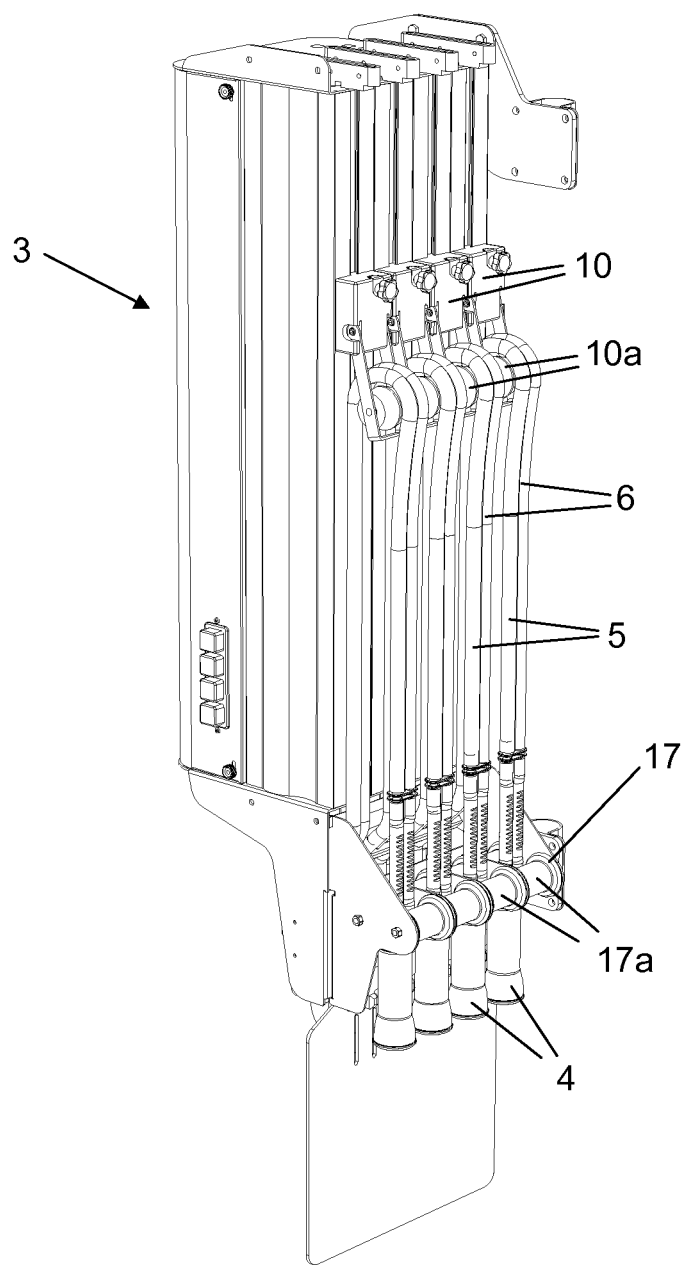
FIG. 2 shows the teat cup magazine in FIG. 1 more in detail and FIG. 3 shows a transmission mechanism of a movably arranged guiding element of the tubes in the magazine.

FIG. 2 shows the teat cup magazine 3 more in detail. Each positioning mechanism in the teat cup magazine 3 comprises a stationary arranged guiding element 17 defining a parking position of a teat cup 4. The stationary guiding element 17 comprises a rolling member 17a. The parking positions of the teat cups 4 are located in a row at a lower end portion of the teat cup magazine 3. The movably arranged guiding element 10 of the milk tube 5 and the pulse tube 6 comprises also a rolling member 10a. The milk tube 5 and the pulse tube 6 extend upwardly from a lower part of the magazine 3 to the rolling member 10a of the movably arranged guiding element 10. The rolling member 10a defines the highest position of the milk tube 5 and the pulse tube 6 in the teat cup magazine 3. The milk tube 5 and the pulse tube 6 extend downwardly from the rolling member 10a to the rolling member 17a of the stationary guiding element in the magazine 3. When a movable guiding element 10 is located in an upper end position in the magazine 3, the corresponding teat cup 4 is in a parking position. When the movable guiding element 10 is displaced to a lower position in the magazine 3, the milk tube 5 and the pulse tube 6 are released to a length corresponding to the vertical position of the movable guiding element 10.

Figure 3:
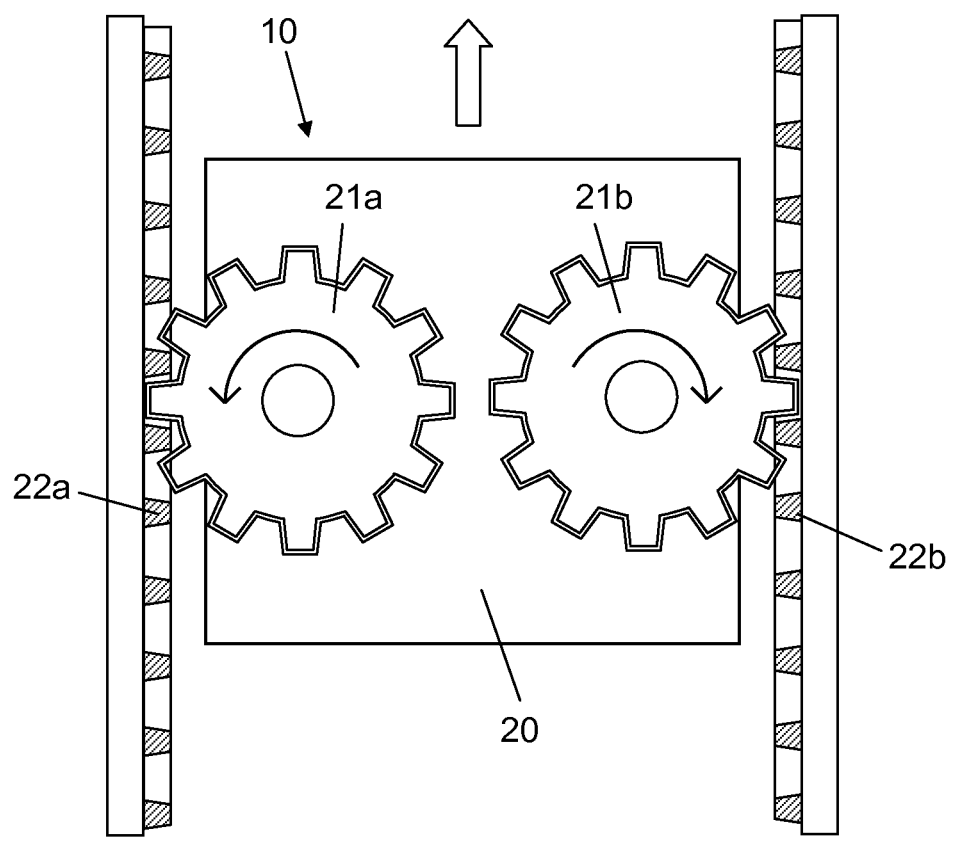

FIG. 3 shows a cross section view of one of the movably arranged guiding elements 10 in the teat cup magazine 3. The movably arranged guiding element 10 comprises an electric motor 20 and a transmission comprising two gear wheels 21a, 21b. The transmission has a design such that it transforms a rotary motion from a shaft of the electric motor to rotary motions of the two gear wheels 21a, 21b. The gear wheels 21a, 21b rotate with the same speed but in opposite directions. The gear wheels 21a, 21b are engaged with a respective gear rod 22a, 22b each having a vertical extension in the magazine 3. The electric motor 20 is controlled by the control unit 14. In this case, the electric motor 14 moves the gear wheels 21a, 21b such that the movable arranged element 10 is displaced upwardly or downwardly in the magazine 3. In this case, it is possible to displace the distance between the movable guiding element 10 and the stationary guiding element 17 in a stepless manner. It is thereby even possible to adjust the release length of the tubes 5, 6 in a stepless manner.

The invention is not limited to the described embodiments but may be varied and modified freely within the scope of the claims.

The invention claimed is:

1. A positioning system, comprising:
   a sensing unit (12, 13a, 13b) that i) senses a parameter allowing estimation of a position of a teat of an animal (1), and ii) provides information of the sensed parameter;
   cup-shaped members (4, 8);
   a flexible tubular element (5, 6, 9) connected to each corresponding one of the cup-shaped members (4, 8);
   a magazine (3,7) that provides a parking position for each tubular element;
   a positioning mechanism that
   i) holds each cup-shaped member and the corresponding tubular element in the parking position in the magazine when the cup-shaped member is not used, and
   ii) controls a pull out motion of each cup-shaped member and the corresponding tubular element from the parking position in the magazine to an attaching position on one teat of the animal; and
   a control unit (14) that
   i) for each tubular element, estimates an individually adapted release length of the tubular element in response to the information from the sensing unit of the sensed parameter, and
   ii) for each tubular element, controls the positioning mechanism to adjust a release length of the tubular element to the estimated individually adapted release length of the tubular element.

2. A positioning system according to claim 1, wherein, the positioning mechanism controls the pull out motion of the tubular element to move the cup-shaped member from the parking position to the attaching position on the one teat such the tubular element is not pulled out to a greater length than the estimated release length.

3. A positioning system according to claim 2, wherein, the positioning mechanism further adjusts the release length of the tubular element to a new estimated release length when the cup-shaped member has been attached to the one teat based a new estimate of the individually adapted release length of the tubular element in response to new information provided from the sensing unit of the sensed parameter to the control unit (14).

4. A positioning system according to claim 1, wherein, the estimated individually adapted release length of the tubular element estimated by the control unit is a length resulting in that a lowest part of the tubular element being located at a level (L1) located least at a minimum predetermined height above a floor surface (2) on which the animal stands.

5. A positioning system according to claim 4, wherein, the estimated individually adapted release length of the tubular element estimated by the control unit further results in the lowest part of the tubular element being located at a level (L2) located at least a minimum predetermined distance below a level of the cup-shaped member.

6. A positioning system according to claim 1, wherein, a sensing unit (13b) further i) senses a position of the animal (1) and ii) provides information of the sensed animal position;
the control unit further i) substantially continuously receives information of the sensed animal position from said sensing unit when the cup-shaped member is attached to the one teat, ii) substantially continuously estimates an individually adapted release length of the tubular element based on the sensed animal position to substantially continuously update a latest estimated release length, and iii) controls the positioning mechanism to adjust the release length of the tubular element to the updated latest estimated release length.

7. A positioning system according to claim 1, wherein, said sensing unit further comprises an identification sensor (12) that senses an identity of the animal, and
the control unit further estimates at least one spatial coordinate (x, y, z) of said one teat using stored information about the identified animal.

8. A positioning system according to claim 1, wherein, said sensing unit further comprises a positioning unit (13a, 13b) that detects at least one spatial coordinate (x, y, z) of said one teat.

9. A positioning system according to claim 1, wherein the positioning mechanism further comprises:
   i) a stationary guiding element (17, 18) at the magazine,
   ii) a movably arranged guiding element (10, 11) at the tubular element, and
   iii) a drive arrangement that displaces the movable guiding element to positions located at different distances from the stationary guiding element when the release length of the tubular element is to be varied.

10. A positioning system according to claim 9, wherein, the movable guiding element comprises a rolling member (10a) that defines a position of an upper part of the tubular element in the magazine.

11. A positioning system according to claim 9, wherein, the positioning mechanism further displaces the movable guiding element to a number of predetermined fixed positions located at different distances from the stationary guiding element when the release length of the tubular element is to be varied.

12. A positioning system according to claim 1, wherein the cup-shaped members comprise at least one of a teat cup (4) and a teat cleaning cup (8).

13. A positioning system according to claim 9, wherein, the positioning mechanism further displaces the movable guiding element, in a stepless manner, to positions located at different distances from the stationary guiding element when the release length of the tubular element is to be varied.

14. A positioning system according to claim 9, wherein, the drive arrangement comprises a motor (20) and a transmission (21a, 21b, 22a, 22b) that displaces the movable guiding element along a path in relation to the stationary guiding element.

15. A positioning system according to claim 14, wherein, the transmission comprises gear wheels (21a, 21b) that displace the movable guiding element along a path formed by gear rods (22a, 22b).

16. A positioning system according to claim 1, further comprising:
   a sensor (15, 16), wherein,
   the control unit further i) receives information from the sensor indicating the cup-shaped member is to be removed from the teat, and ii) upon receiving the information from the sensor, activates the positioning mechanism to retract the cup-shaped member from the attaching position on the one teat to the parking position in the magazine.

17. A positioning system according to claim 1, further comprising:
   a sensor that senses when the cup-shaped member is to be removed from the teat, wherein,
   the control unit further receives information from the sensor that the cup-shaped member is to be removed from the teat and to activate the positioning mechanism to retract the cup-shaped member from the attaching position on the one teat.

18. A positioning system according to claim 17, wherein, the sensor further senses when the cup-shaped member is to be moved to the parking position in the magazine, and
   the control unit further receives information from the sensor that the cup-shaped member is to be moved to the parking position in the magazine, and activates the positioning mechanism to move the cup-shaped member to the parking position in the magazine.

19. A positioning system according to claim 1, wherein at least one of the cup-shaped members is a teat cup (4).

20. A positioning system according to claim 2, wherein, the estimated individually adapted release length of the tubular element estimated by the control unit is a length resulting in that a lowest part of the tubular element being located at a level (L1) located least at a minimum predetermined height above a floor surface (2) on which the animal stands.

* * * * *